United States Patent
Mestha et al.

(10) Patent No.: US 9,998,487 B2
(45) Date of Patent: Jun. 12, 2018

(54) DOMAIN LEVEL THREAT DETECTION FOR INDUSTRIAL ASSET CONTROL SYSTEM

(71) Applicant: General Electric Company, Schenectady, NY (US)

(72) Inventors: Lalit Keshav Mestha, Niskayuna, NY (US); Jonathan Carl Thatcher, Greenville, SC (US); Daniel Francis Holzhauer, Costa Mesa, CA (US); Justin Varkey John, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 130 days.

(21) Appl. No.: 15/137,311

(22) Filed: Apr. 25, 2016

(65) Prior Publication Data

US 2017/0310690 A1    Oct. 26, 2017

(51) Int. Cl.
*G06F 21/55*    (2013.01)
*H04L 29/06*    (2006.01)
*G06N 99/00*    (2010.01)

(52) U.S. Cl.
CPC .......... *H04L 63/1425* (2013.01); *G06F 21/55* (2013.01); *G06N 99/005* (2013.01); *H04L 63/1441* (2013.01)

(58) Field of Classification Search
CPC ................................ H04L 63/14; G06F 21/55
See application file for complete search history.

(56) References Cited

U.S. PATENT DOCUMENTS

| 7,225,343 B1 | 5/2007 | Honig et al. |
| 8,973,123 B2 | 3/2015 | Chong et al. |

(Continued)

FOREIGN PATENT DOCUMENTS

| WO | 2014/144857 A2 | 9/2014 |
| WO | 2016/020660 A1 | 2/2016 |

OTHER PUBLICATIONS

Yan, Weizhong et al. "On Accurate and Reliable Anomaly Detection for Gas Turbine Combustors: A Deep Learning Approach", Annual Conference of the Prognostics and Health Management Society, Aug. 2005, (pp. 1-8, total 8pgs).

(Continued)

*Primary Examiner* — Izunna Okeke
(74) *Attorney, Agent, or Firm* — GE Global Patent Operation; John P. Darling

(57) ABSTRACT

A normal space data source stores, for each of a plurality of threat nodes, a series of normal values that represent normal operation of an industrial asset control system, and a threatened space data source stores a series of threatened values. A model creation computer may generate sets of normal and threatened feature vectors. The computer may also calculate and output at least one decision boundary for a threat detection model based on the normal and threatened feature vectors. The plurality of threat nodes may then generate a series of current values from threat nodes that represent a current operation of the asset control system. A threat detection computer may receive the series of current values from threat nodes, generate a set of current feature vectors, execute the threat detection model, and transmit a threat alert signal based on the current feature vectors and at the least one decision boundary.

21 Claims, 12 Drawing Sheets

(56) References Cited

U.S. PATENT DOCUMENTS

| | | |
|---|---|---|
| 9,130,983 B2 | 9/2015 | Heo et al. |
| 9,245,116 B2 | 1/2016 | Evans et al. |
| 2007/0289013 A1 | 12/2007 | Lim |
| 2013/0104236 A1 | 4/2013 | Ray et al. |
| 2013/0291115 A1 | 10/2013 | Chong et al. |
| 2014/0359708 A1 | 12/2014 | Schwartz |
| 2015/0033341 A1 | 1/2015 | Schmidtler et al. |
| 2016/0033941 A1 | 2/2016 | T et al. |
| 2017/0054751 A1* | 2/2017 | Schneider ........... H04L 63/1425 |

OTHER PUBLICATIONS

Mantere, M., et al., "Challenges of Machine Learning Based Monitoring for Industrial Control System Networks," 26th International Conference on Advanced Information Networking and Applications Workshops (WAINA), pp. 968-972 (Mar. 26-29, 2012).

Nalavade, K., et al., "Finding Frequent Itemsets using Apriori Algorihm to Detect Intrusions in Large Dataset," International Journal of Computer Applications & Information Technology, vol. 6, Issue. I, pp. 84-92 (Jun.-Jul. 2014).

Skormin, V., et al., "The behavioral approach to diagnostics of cyber-physical systems," Autotestcon, pp. 1-5 (Sep. 15-18, 2014).

Extended European Search Report and Opinion issued in connection with corresponding EP Application No. 17167806.3 dated Aug. 25, 2017.

* cited by examiner

FIG. 12

| THREAT NODE IDENTIFIER 1202 | THREAT NODE VALUES 1204 | FEATURES 1206 | FEATURE VECTOR 1208 | GLOBAL FEATURE VECTOR 1210 | DECISION 1212 |
|---|---|---|---|---|---|
| TN_2001 | 1.43, 1.09, 1.61, 1.30, 1.83, 1.36, 1.29, 1.83, 1.21 | | | | ATTACK |
| TN_2002 | 1.50, 1.56, 1.24, 1.96, 1.32, 1.32, 0.54, 2.11, 1.06 | | | | |
| TN_2003 | 1.68, 1.43, 1.12, 1.53, 1.34, 0.42, 1.41, 1.75, 2.12 | | | | |
| TN_2004 | 1.75, 1.2-, 1.02, 1.19, 0.93, 1.73, 1.18, 0.81, 1.90 | | | | |

1200

DOMAIN LEVEL THREAT DETECTION FOR INDUSTRIAL ASSET CONTROL SYSTEM

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.), that could disrupt electric power generation and distribution, damage engines, inflict vehicle malfunctions, etc. Current methods primarily consider threat detection in Information Technology ("IT," such as, computers that store, retrieve, transmit, manipulate data) and Operation Technology ("OT," such as direct monitoring devices and communication bus interfaces). Cyber-threats can still penetrate through these protection layers and reach the physical "domain" as seen in 2010 with the Stuxnet attack. Such attacks can diminish the performance of a control system and may cause total shut down or catastrophic damage to a plant. Currently, no methods are available to automatically detect, during a cyber-incident, threats at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one threat node, such as a sensor node, is used in a detection algorithm). Existing approaches to protect an industrial control system, such as failure and diagnostics technologies, may not adequately address these threats—especially when multiple, simultaneous attacks occur since such multiple faults/failure diagnostic technologies are not designed for detecting stealthy attacks in an automatic manner. It would therefore be desirable to protect an industrial asset control system from cyber threats in an automatic and accurate manner even when attacks percolate through the IT and OT layers and directly harm control systems.

SUMMARY

According to some embodiments, a system to protect an industrial asset control system from cyber threats may include a normal space from threat nodes (also referred to as "threat points"). Threat nodes might be signals from critical sensors, controller nodes, actuators, and/or key software nodes to be used to monitor occurrences of cyber-threats or abnormal events. The normal space data source may store data, for each of a plurality of threat nodes (e.g., sensor nodes, actuator nodes, controller nodes, software nodes, etc.), a series of normal values (also referred to as a "data stream") from threat nodes that represent normal operation of an industrial asset control system. Similarly, a threatened space data source may store a series of threatened values from threat nodes. Threatened values may be regarded as abnormal space data. Normally, control systems do not operate in the abnormal space, since such operation might result in damage, cause a total shutdown, and/or produce catastrophic damage or slow degradation of plant components. A model creation computer may generate sets of normal and threatened feature vectors using values from threat nodes. Features might comprise individual quantities extracted from one or more measured data streams. The computer may also calculate and output a decision boundary for a threat detection model based on the normal and threatened feature vectors. The plurality of these values may then generate a series of current values from threat nodes that represent a current operation of the asset control system. A threat detection computer may receive the series of current values from threat nodes, generate a set of current feature vectors from these values, execute the threat detection model, and transmit a threat alert signal based on the current feature vectors and decision boundary.

Some embodiments comprise: means for retrieving, for each of a plurality of threat nodes, a series of normal values from threat nodes over time that represent normal operation of the industrial asset control system; means for retrieving, for each of the plurality of threat nodes, a series of threatened or abnormal values from threat nodes over time that represent a threatened operation of the industrial asset control system; and means for automatically calculating and outputting a decision boundary for a threat detection model based on the set of normal feature vectors and the set of threatened feature vectors.

Other embodiments comprise: means for receiving, from a plurality of threat nodes, a series of values over time that represent a current operation of the industrial asset control system; means for generating, by a threat detection computer based on the received series of values from threat nodes, a set of current feature vectors; and means for executing a threat detection model that transmits a threat alert signal based on the set of current feature vectors and a decision boundary.

Some technical advantages of some embodiments disclosed herein are improved systems and methods to protect an industrial asset control system from cyber threats in an automatic and accurate manner.

BRIEF DESCRIPTION OF THE DRAWINGS

FIG. 12 is a tabular portion of a threat detection database.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
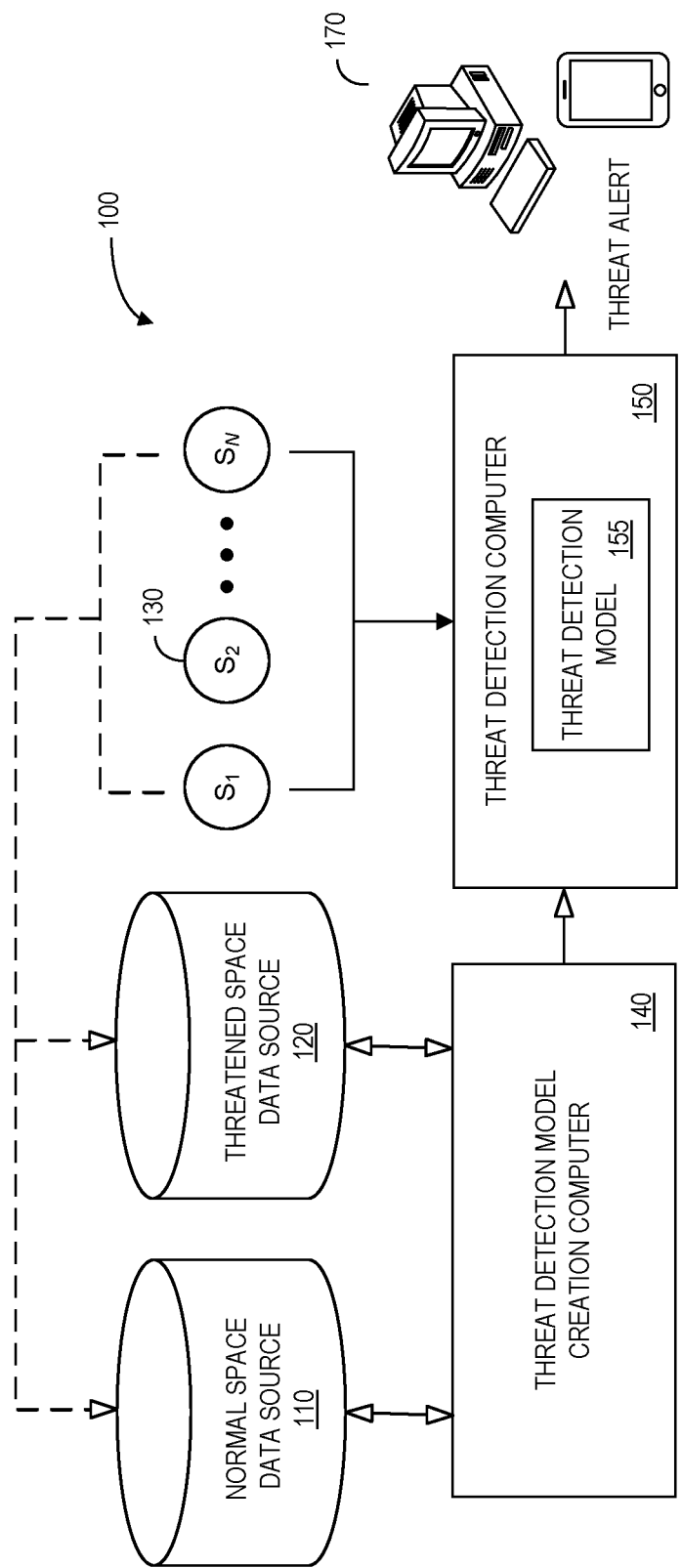
FIG. 1 is a high-level block diagram of a system that may be provided in accordance with some embodiments.

Industrial control systems that operate physical systems are increasingly connected to the Internet. As a result, these control systems have been increasingly vulnerable to threats and, in some cases, multiple attacks may occur simultaneously. Existing approaches to protect an industrial control system, such as failure and diagnostics technologies, may not adequately address these threats—especially when multiple, simultaneous attacks occur. It would therefore be desirable to protect an industrial asset control system from cyber threats in an automatic and accurate manner. FIG. 1 is a high-level architecture of a system 100 in accordance with some embodiments. The system 100 may include a "normal space" data source 110 and a "threatened space" data source 120. The normal space data source 110 might store, for each of a plurality of threat nodes 130, a series of normal values over time that represent normal operation of an industrial asset control system (e.g., generated by a model or collected from actual sensor 130 data as illustrated by the dashed line in FIG. 1). The threatened space data source 120 might store, for each of the threat nodes 130, a series of threatened values that represent a threatened operation of the industrial asset control system (e.g., when the system is experiencing a cyber-attack).

Information from the normal space data source 110 and the threatened space data source 120 may be provided to a threat detection model creation computer 140 that uses this data to create a decision boundary (that is, a boundary that separates normal behavior from threatened behavior). The decision boundary may then be used by a threat detection computer 150 executing a threat detection model 155. The threat detection model 155 may, for example, monitor streams of data from the threat nodes 130 comprising data from sensor nodes, actuator nodes, and/or any other critical monitoring nodes (e.g., threat nodes $S_1$ through $S_N$) and automatically output a threat alert signal to one or more remote monitoring devices 170 when appropriate (e.g., for display to a user). As used herein, the term "automatically" may refer to, for example, actions that can be performed with little or no human intervention. According to some embodiments, information about detected threat may be transmitted back to the industrial control system.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The threat detection model creation computer 140 may store information into and/or retrieve information from various data stores, such as the normal space data source 110 and/or the threatened space data source 120. The various data sources may be locally stored or reside remote from the threat detection model creation computer 140. Although a single threat detection model creation computer 140 is shown in FIG. 1, any number of such devices may be included. Moreover, various devices described herein might be combined according to embodiments of the present invention. For example, in some embodiments, the threat detection model creation computer 140 and one or more data sources 110, 120 might comprise a single apparatus. The threat detection model creation computer 140 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage threat information in accordance with any of the embodiments described herein. In some cases, an interactive graphical display interface may let a user define and/or adjust certain parameters (e.g., threat detection trigger levels) and/or provide or receive automatically generated recommendations or results from the threat detection model creation computer 140 and/or threat detection computer 150.

Figure 2:
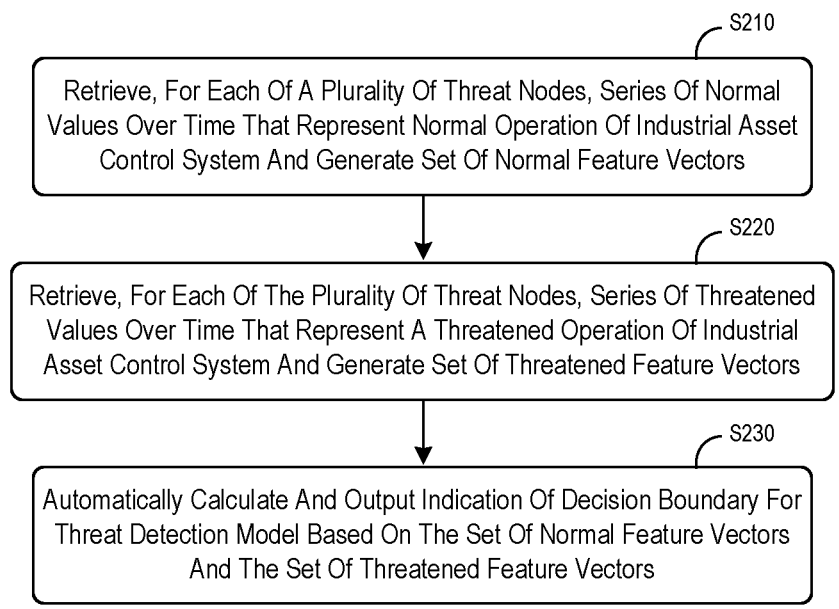
FIG. 2 is a model creation method according to some embodiments.

For example, FIG. 2 illustrates a model creation method that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the system may retrieve, for each of a plurality of threat nodes, a series of normal values over time that represent normal operation of the industrial asset control system and a set of normal feature vectors may be generated. Similarly, at S220 the system may retrieve, for each of the plurality of threat nodes, a series of threatened values over time that represent a threatened operation of the industrial asset control system and a set of threatened feature vectors may be generated. The series of normal and/or threatened values might be obtained, for example, by running Design of Experiments ("DoE") on an industrial control system associated with a power turbine, a jet engine, a locomotive, an autonomous vehicle, etc. At S230, a decision boundary may be automatically calculated and output for a threat detection model based on the set of normal feature vectors and the set of threatened feature vectors. According to some embodiments, the decision boundary might be associated with a line, a hyperplane, a non-linear boundary separating normal space from threatened space, and/or a plurality of decision boundaries. Moreover, a decision boundary might comprise a multi-class decision boundary separating normal space, threatened space, and degraded operation space. In addition, note that the threat detection model might be associated with the decision boundary, feature mapping functions, and/or feature parameters.

Figure 3:
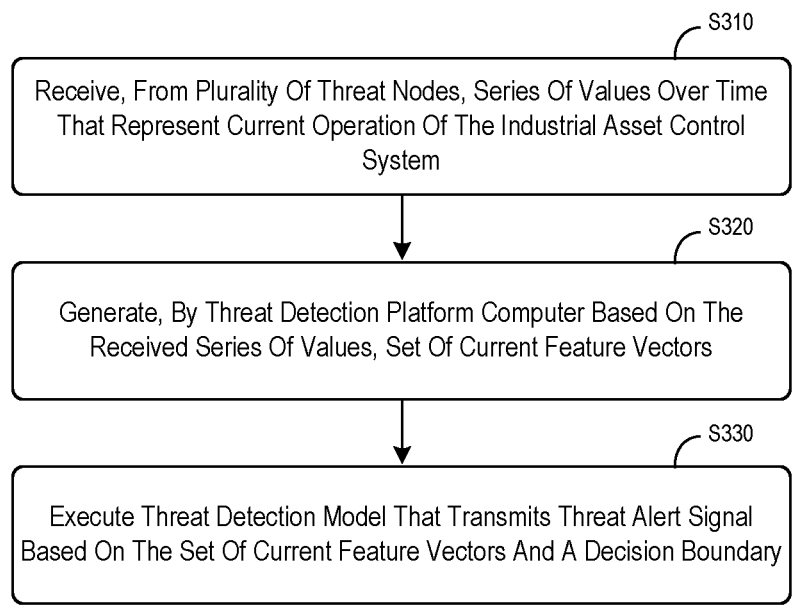
FIG. 3 is threat alert method according to some embodiments.

The decision boundary can then be used to detect cyber-attacks. For example, FIG. 3 is threat alert method according to some embodiments. At S310, the system may receive, from a plurality of threat nodes, a series of current values over time that represent a current operation of the industrial asset control system. At S320, a threat detection computer may then generate, based on the received series of current values, a set of current feature vectors. At S330, a threat detection model may be executed to transmit a threat alert signal based on the set of current feature vectors and a decision boundary when appropriate (e.g., when a cyber-attack is detected). According to some embodiments, one or more response actions may be performed when a threat alert signal is transmitted. For example, the system might automatically shut down all or a portion of the industrial asset control system (e.g., to let the detected potential cyber-attack be further investigated). As other examples, one or more parameters might be automatically modified, a software application might be automatically triggered to capture data and/or isolate possible causes, etc.

Some embodiments described herein may take advantage of the physics of a control system by learning a priori from tuned high fidelity equipment models and/or actual "on the job" data to detect single or multiple simultaneous adversarial threats to the system. Moreover, according to some embodiments, all threat node data may be converted to features using advanced feature-based methods, and the real-time operation of the control system may be monitoring in substantially real-time. Abnormalities may be detected by classifying the monitored data as being "normal" or disrupted (or degraded). This decision boundary may be constructed using dynamic models and may help enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account on operator's knowledge about system operation (e.g., the differences between normal and abnormal operation).

Figure 4:
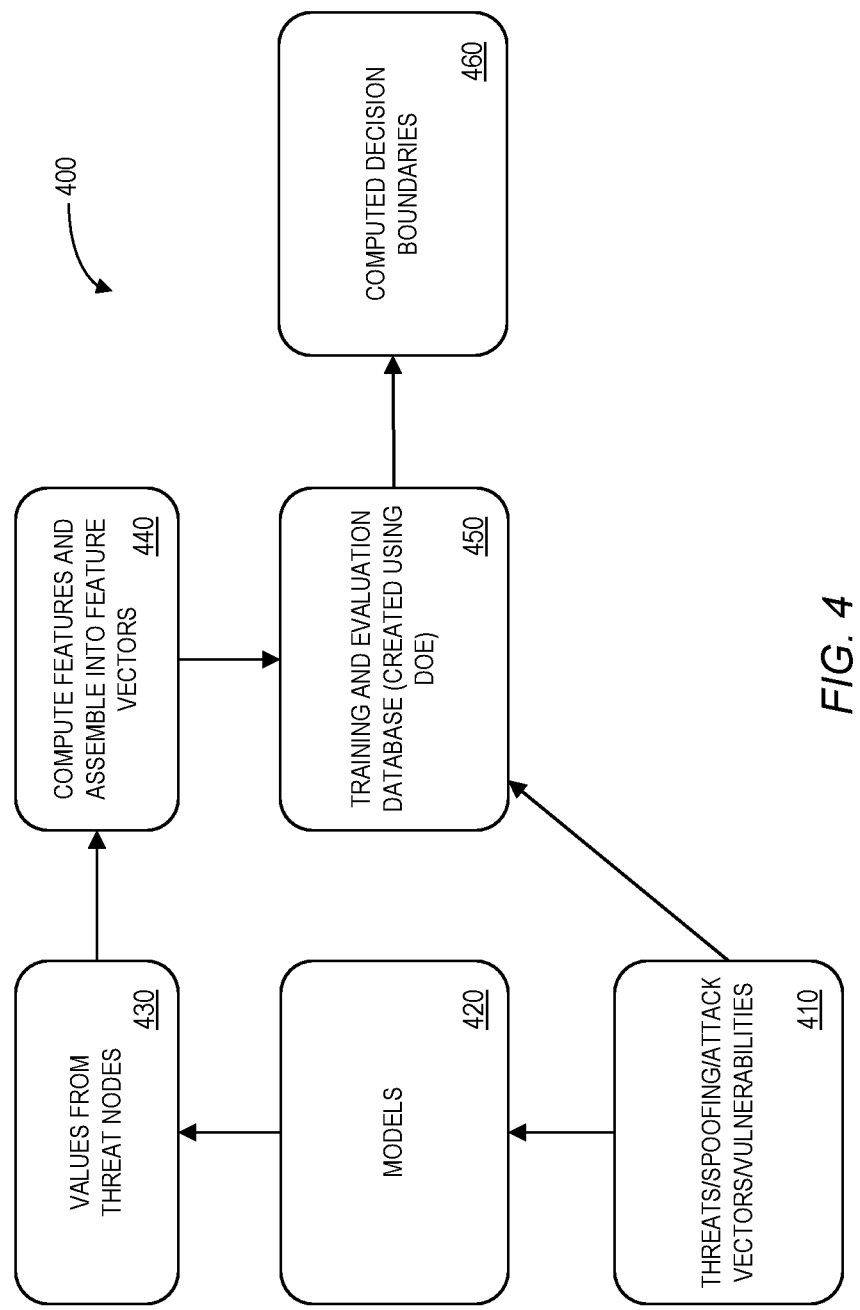
FIG. 4 illustrates an off-line process in accordance with some embodiments.

FIG. 4 illustrates an off-line boundary creation process 400 in accordance with some embodiments. Information about threats, spoofing, attack vectors, vulnerabilities, etc. 410 may be provided to models 420 and/or a training and evaluation database 450 created using DoE techniques. The models 420 may, for example, simulate data 430 from threat nodes to be used to compute features that are assembled into a feature vector 440 to be stored in the training and evaluation database 450. The data in the training and evaluation database 450 may then be used to compute decision boundaries 460 to distinguish between normal operation and threatened operation. According to some embodiments, the process 400 may include a prioritization of threat nodes and anticipated threat vectors to form one or more data sets to develop decision boundaries. Threat vectors are abnormal values at critical inputs where malicious attacks can be created at the domain level that will make the system go into threatened/abnormal space. In addition, the models 420 may comprise high fidelity models that can be used to create a data set (e.g., a set that describes threat space as "levels of threat conditions in the system versus quantities from the threat nodes"). The data 430 from the threat nodes might be, for example, quantities that are captured for a length of from 30 to 50 seconds from sensor nodes, actuator nodes, and/or controller nodes (and a similar data set may be obtained for "levels of normal operating conditions in the system versus quantities from the threat nodes"). This process will result in data sets for "threat space" and "normal space." The 30 to 50 seconds long quantities may be used to compute features 440 using feature engineering to create feature vectors. These feature vectors can then be used to obtain a decision boundary that separates the data sets for threat space and normal space (used to detect an anomaly such as a cyber-attack).

Since attacks might be multi-prong (e.g., multiple attacks might happen at once), DoE experiments may be designed to capture the attack space (e.g., using full factorial, Taguchi screening, central composite, and/or Box-Behnken). When models are not available, these DoE methods can also be used to collect data from real-world asset control system. Experiments may run, for example, using different combinations of simultaneous attacks. Similar experiments may be run to create a data set for the normal operating space. According to some embodiments, the system may detect "degraded" or faulty operation as opposed to a threat or attack. Such decisions may require the use of a data set for a degraded and/or faulty operating space.

Figure 5:
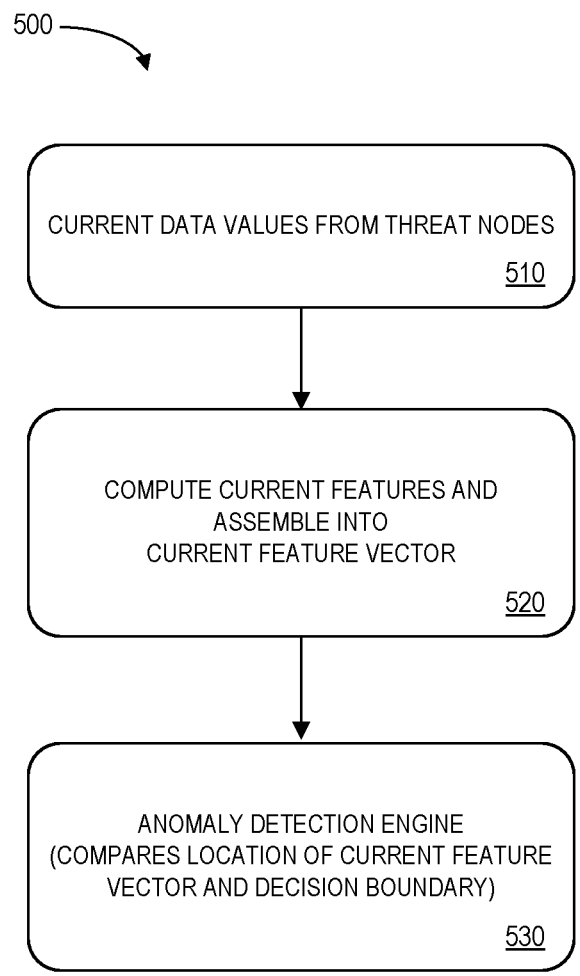
FIG. 5 illustrates a real-time process according to some embodiments.

FIG. 5 illustrates a real-time process 500 to protect an industrial asset control system according to some embodiments. At 510, current data from threat nodes may be gathered (e.g., in batches of from 30 to 50 seconds). At 520, the system may compute features and form feature vectors. For example, the system might use weights from a principal component analysis as features. At 530, an anomaly detect engine may compare location of feature vectors to a decision boundary to make a determination (and output an alert signal if necessary). According to some embodiments, threat node data from models (or from real systems) may be expressed in terms of features since features are a high level representation of domain knowledge and can be intuitively explained. Moreover, embodiments may handle multiple features represented as vectors and interactions between multiple sensed quantities might be expressed in terms of "interaction features."

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple threat nodes and specific locations). Embodiments may incorporate any number of features, with more features allowing the approach to become more accurate as the system learns more about the physical process and threat. According to some embodiments, dissimilar values from threat nodes may be normalized to unit-less space, which may allow for a simple way to compare outputs and strength of outputs.

Figure 6:
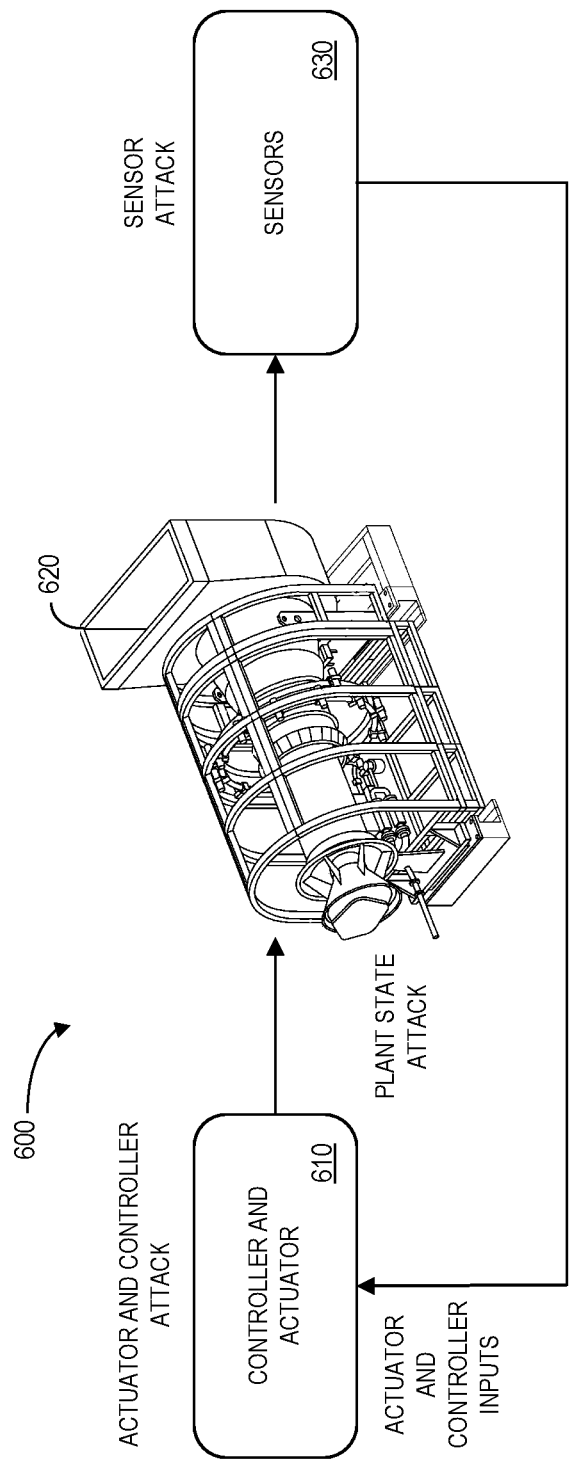
FIG. 6 is an example associated with a gas turbine engine in accordance with some embodiments.

FIG. 6 is an example 600 associated with a gas turbine engine in accordance with some embodiments. In particular, the example includes a controller and actuator portion 610 subject to actuator and controller attacks, a plant portion 620 subject to plant state attacks, and threat nodes 630 subject to threat node attacks. By way of examples only, the threat nodes 630 might comprise physical and/or virtual threat nodes associated with turbine exhaust, ambient temperature, ambient pressure, an inlet pressure drop, a compressor inlet temperature, a generator output, a fuel pressure, shaft speed, a compressor discharge pressure or temperature, an exhaust gas temperature, emissions, etc. The actuators might be associated with, for example, an inlet guide valve command, a bleed heat valve command, fuel or stop valve position, an ambient pressure, an inlet or exhaust pressure delta, a specific humidity or ambient temperature, a fuel flow, or a temperature of fuel. By monitoring the information in the gas turbine engine system, a threat detection platform may be able to detect cyber-attacks (e.g., using feature vectors and a decision boundary) that could potentially cause a large amount of damage.

Figure 7:
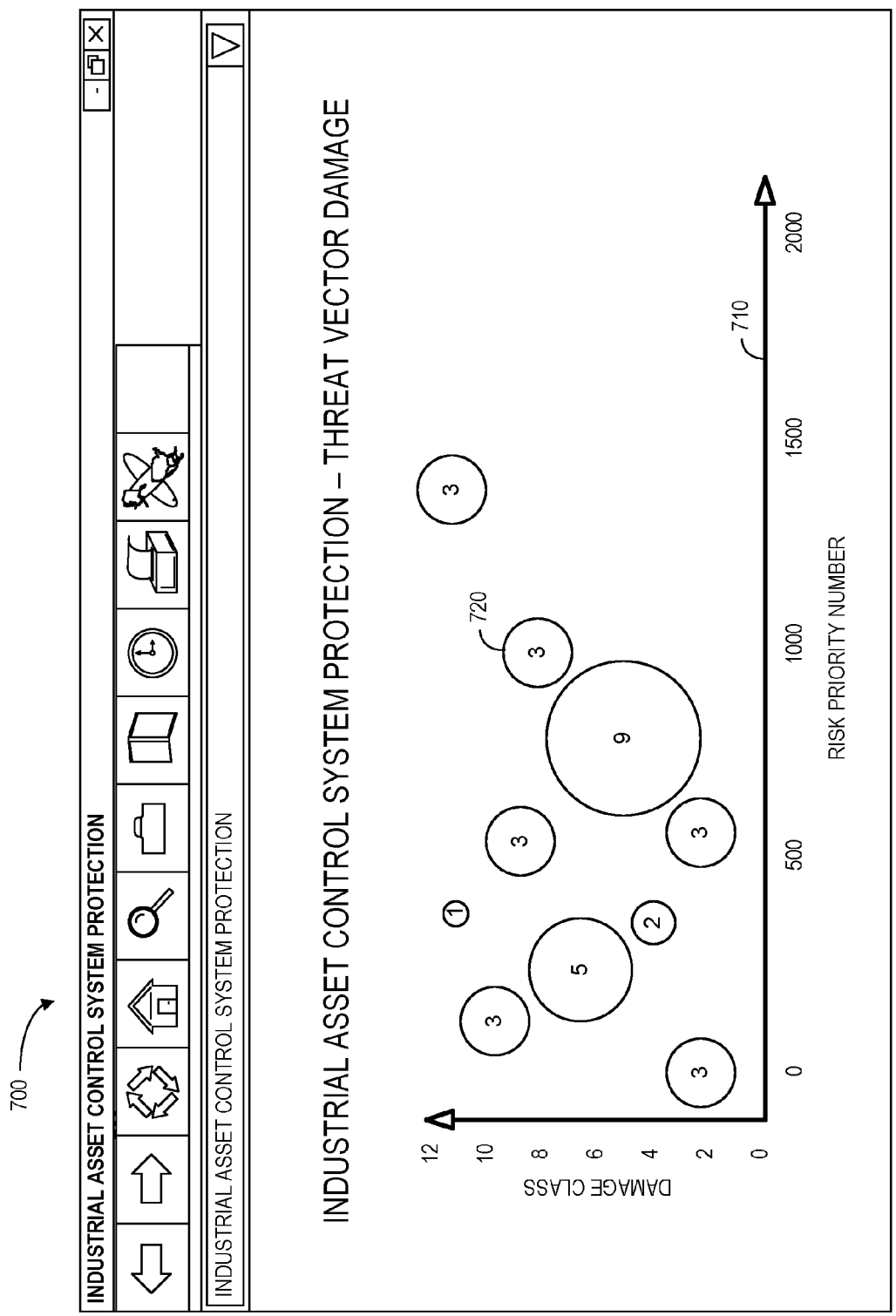
FIG. 7 is a threat vector damage display according to some embodiments.

FIG. 7 is a threat vector damage display 700 according to some embodiments. In particular, the display includes a graph 710 charting a Risk Priority Number ("RPN"), with larger values representing larger risks, and a damage class value, with larger values being associated with greater damage (e.g., financial, unit availability, unit trip, loss of unit life, asset damage requiring new parts, etc.). At each graph 710 location where at least one threat vector is shown, a bubble 720 indicates how many threats are associated with those values (with larger bubbles 720 being associated with a larger number of threats). According to some embodiments, domain knowledge and/or a sensitivity study may be used to reduce the number of threat nodes required to adequately detect threats. Moreover, an RPN analysis (e.g., calculating the RPN based on expertise, time, ease, damages, etc.) may further re-group many threats based on some criteria, such as damage class versus RPN. Moreover, some embodiments may use a structured DoE method to create data sets, such as by running combinations of full-factorial design, screening designs, and/or central composite designs for different damage classes separately or by combining all of the damage classes into a single set.

Figure 8:
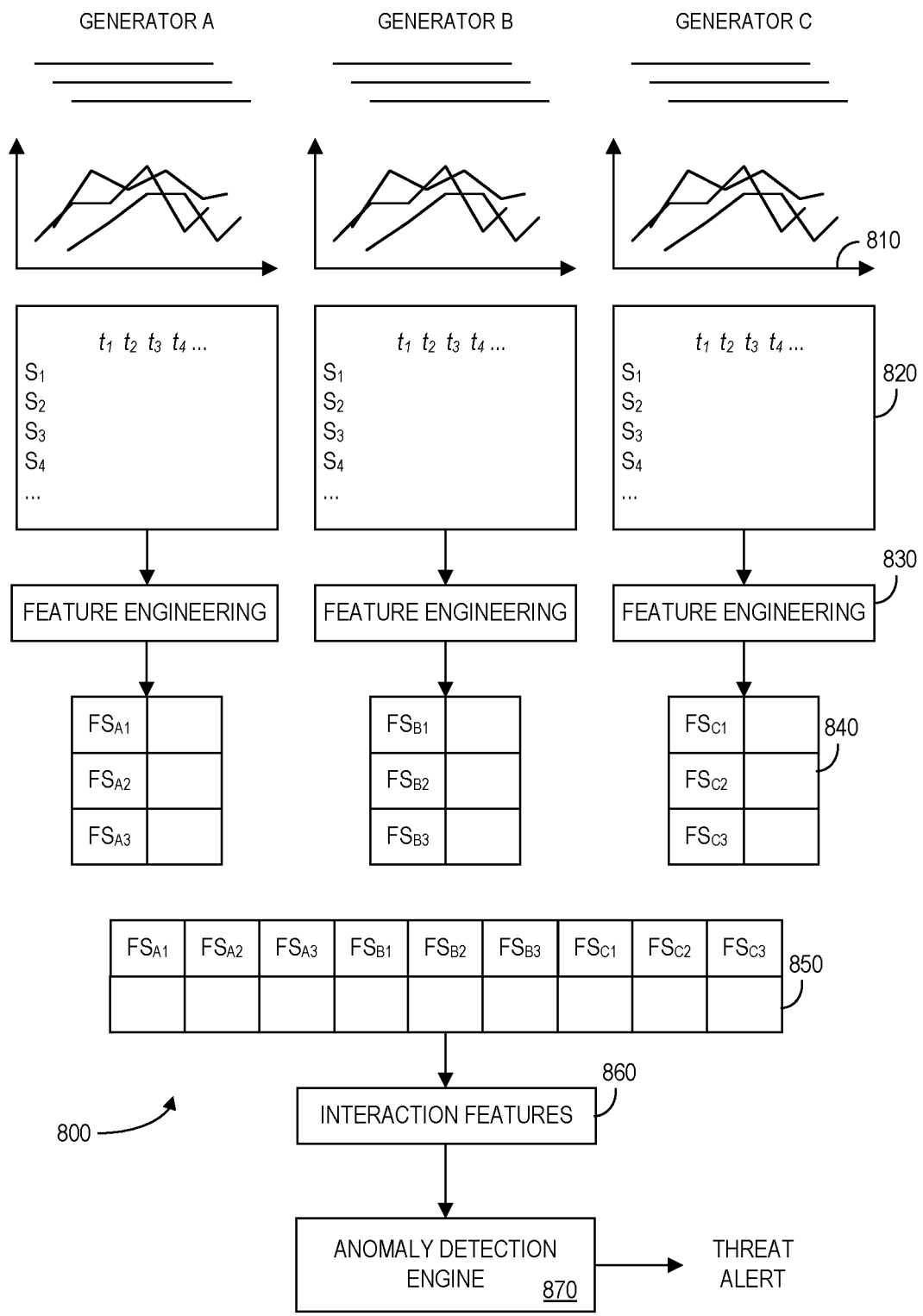
FIG. 8 is an example of a global threat protection system in accordance with some embodiments.

FIG. 8 is an example of a global threat protection system 800 in accordance with some embodiments. In particular, system includes three generators (A, B, and C) and batches of values 810 from threat nodes are collected for each generated over a period of time (e.g., 30 to 50 seconds). According to some embodiments, the batches of values 810 from threat nodes overlap in time. The values 810 from threat nodes may, for example, be stored in a matrix 820 arranged by time ($t_1$, $t_2$, etc.) and by type of threat node ($S_1$, $S_2$, etc.). Feature engineering components 830 may use information in each matrix 820 to create a feature vector 840 for each of the three generators (e.g., the feature vector 840 for generator C might include $FS_{C1}$, $FS_{C2}$, etc.). The three feature vectors 840 may then be combined into a single global feature vector 850 for the system 800. Interaction features 860 may be applied (e.g., associated with A*B*C, A+B+C, etc.) and an anomaly detection engine 870 may compare the result with a decision boundary and output a threat alert signal when appropriate.

Figure 9:
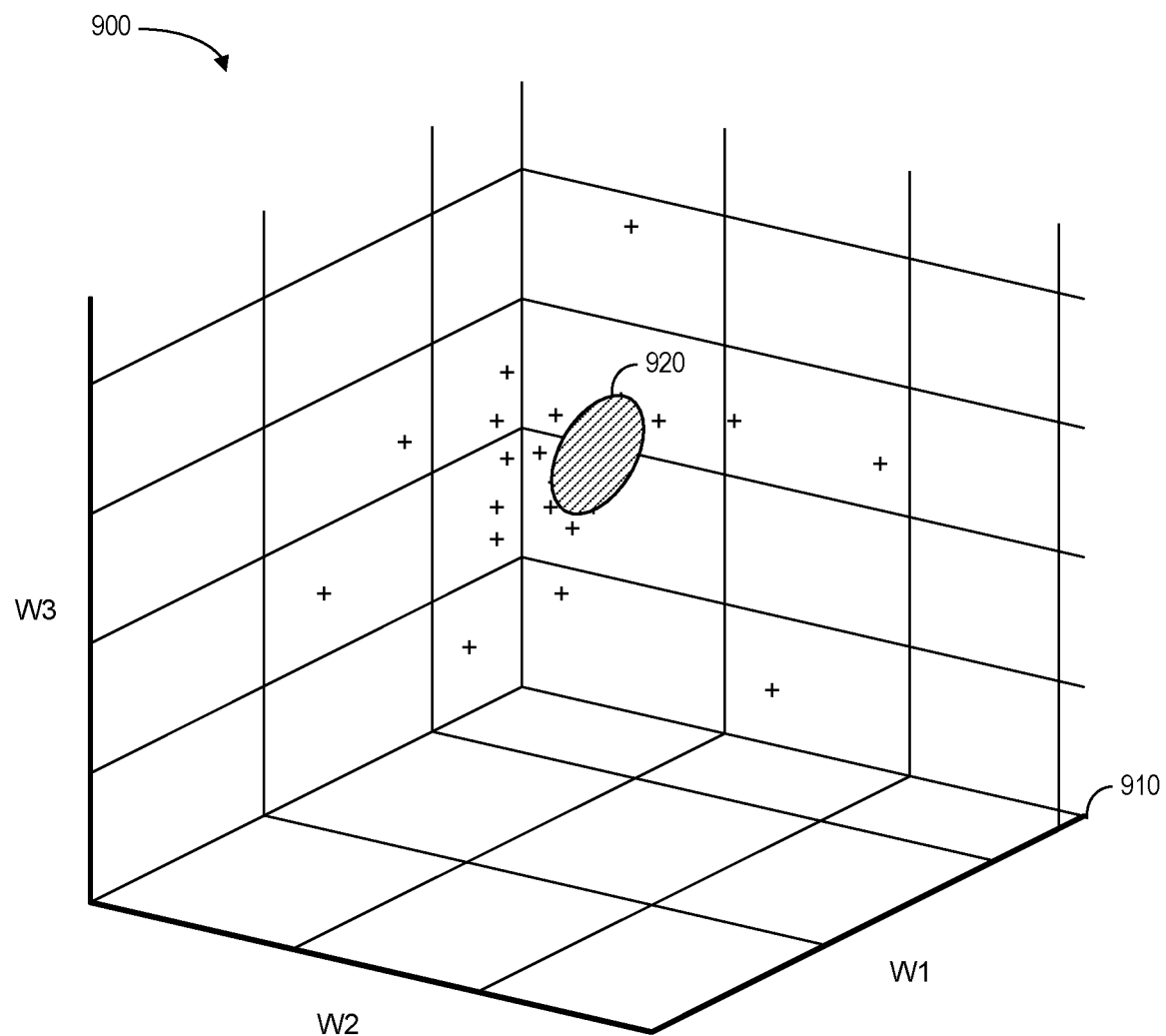
FIG. 9 illustrates three dimensions of sensor outputs in accordance with some embodiments.

FIG. 9 illustrates 900 three dimensions of threat node outputs in accordance with some embodiments. In particular, a graph 910 plots threat node outputs ("+") in three dimensions, such as dimensions associated with Principal Component Features ("PCF"): w1, w2, and w3. Moreover, the graph 910 includes an indication of a normal operating space decision boundary 920. Although a single contiguous boundary 920 is illustrated in FIG. 9, embodiments might be associated with multiple regions. Note that PCF information may be represented as weights in reduced dimensions. For example, data from each threat node may be converted to low dimensional features (e.g., weights). According to some embodiments, threat node data is normalized as follows:

$$S_{normalized}(k) = \frac{S_{nominal}(k) - S_{original}(k)}{\overline{S}_{nominal}}$$

where S stands for a threat node quantity at "k" instant of time. Moreover, output may then be expressed as a weighted linear combination of basis functions as follows:

$$S = S_0 + \sum_{j=1}^{N} w_j \Psi_j$$

where $S_0$ is the average threat node output with all threats, $w_j$ is the $j^{th}$ weight, and $\Psi_j$ is the $j^{th}$ basis vector. According to some embodiments, natural basis vectors are obtained using a covariance of the threat nodes' data matrix. Once the basis vectors are known, weight may be found using the following equation (assuming that the basis sets are orthogonal):

$$w_j = (S - S_0)^T \Psi_j$$

Note that weights may be an example of features used in a feature vector.

Figure 10:
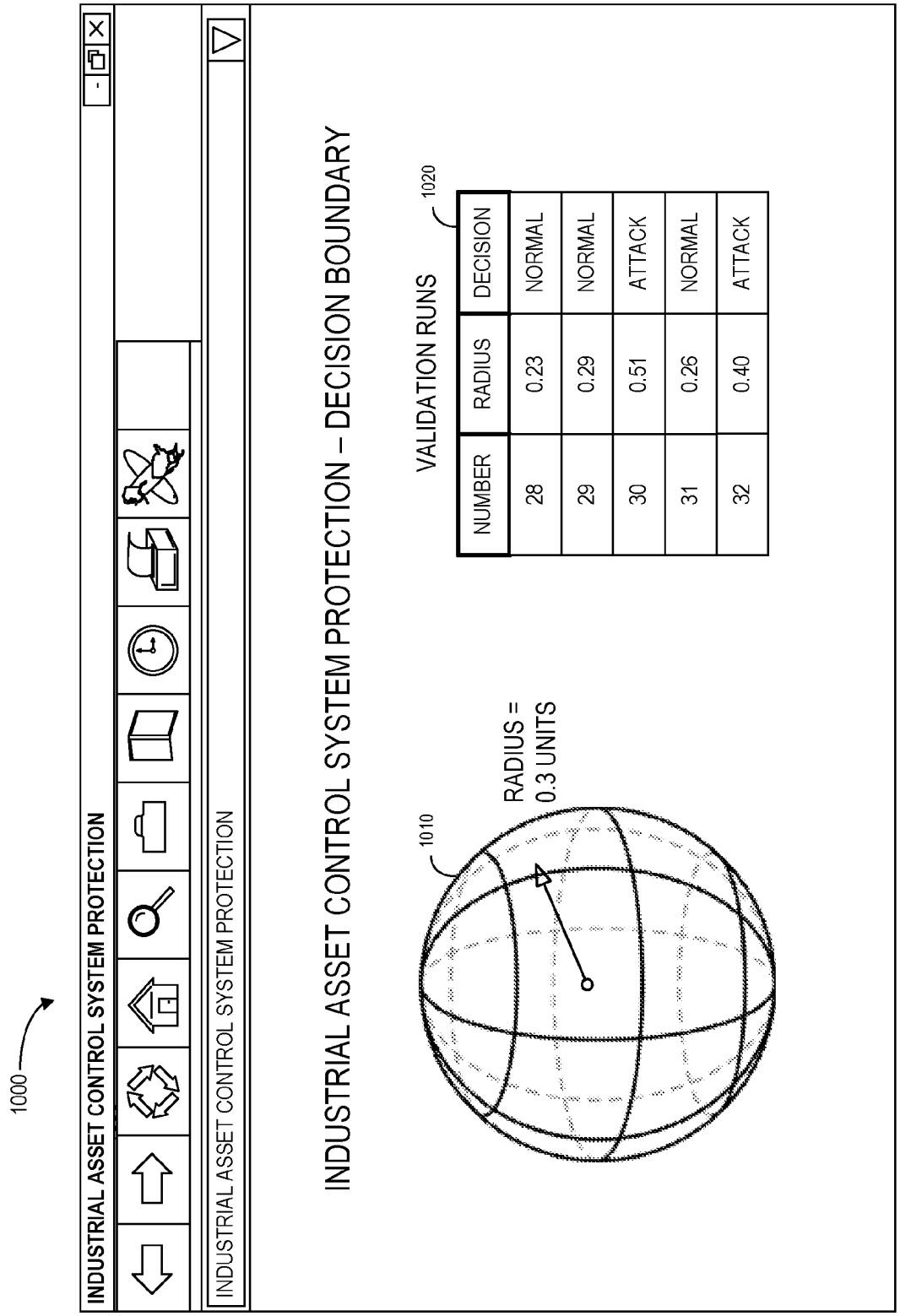
FIG. 10. is a decision boundary display according to some embodiments.

FIG. 10. is a decision boundary display 1000 according to some embodiments. The display 1000 includes a graphical representation of a simple decision boundary 1010 (in three dimensions it is a ball or a sphere having a radius of 0.3 units) that might be associated with, for example, global features generated from threat node values, such as values from sensor nodes, in gas turbine simulation data. According to some embodiments, a number of threat validation runs are executed and the results 1020 are provided on the display 1000 (e.g., including the run number, the radius value, and the decision of "normal" or "attack").

Thus, once the observed quantities from threat nodes are expressed in terms of feature vectors (e.g., with many features), the feature vectors may then be used as points in a multi-dimensional feature space. During real-time threat detection, decisions may be made by comparing where each point falls with respect to a decision boundary that separates the space between two regions (or spaces): abnormal ("attack") space and normal operating space. If the point falls in the attack space, the industrial asset control system is undergoing an abnormal operation such as during a cyber-attack. If the point falls in the normal operating space, the industrial asset control system is not undergoing an abnormal operation such as during a cyber-attack. Appropriate decision zone with boundaries are constructed using data sets as described herein with high fidelity models. For example, support vector machines may be used with a kernel function to construct a decision boundary. According to some embodiments, deep learning techniques may also be used to construct decision boundaries.

According to some embodiments, the system may instead divide space into three areas: (1) an attack space, (2) a normal operating space, and (3) a degraded or faulty space. With this type of "multi-class" decision, the problem can be decomposed into a set of two unlinked binary problems and may be solved using binary support vector machines with "attack versus normal" and "degraded versus normal" data sets.

Figure 11:
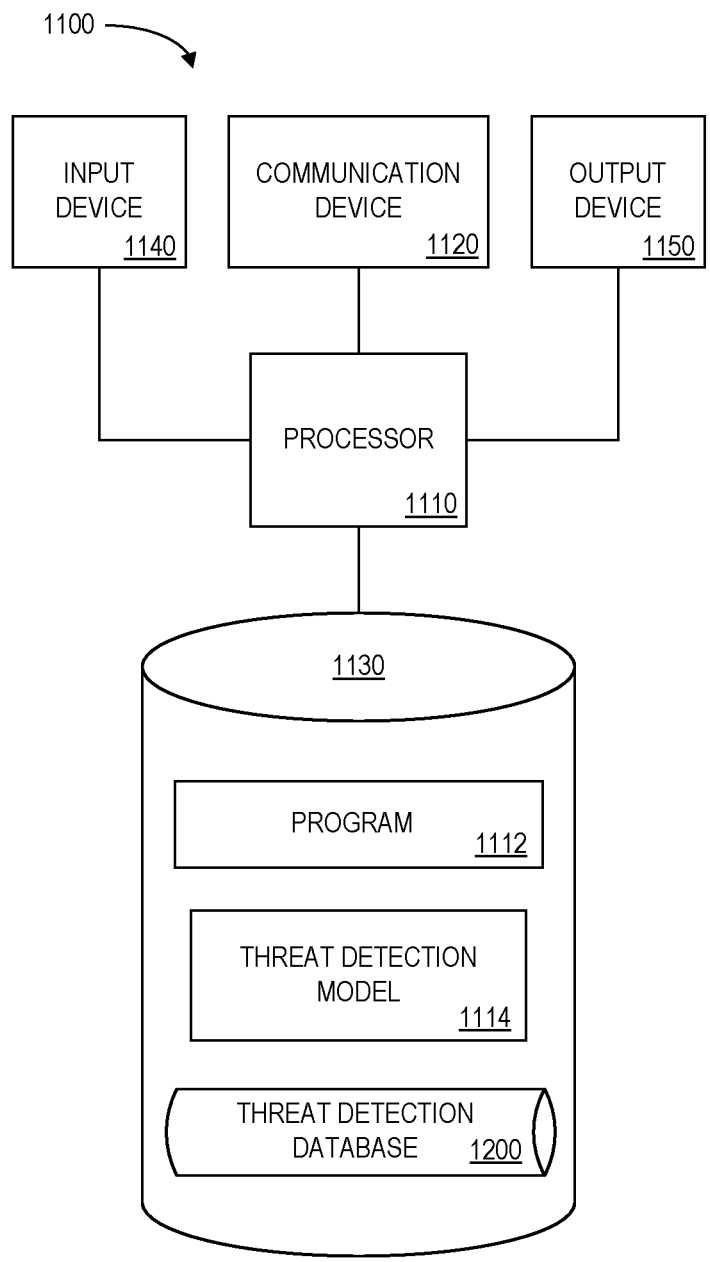
FIG. 11 is a block diagram of an industrial asset control system protection platform according to some embodiments of the present invention.

The embodiments described herein may be implemented using any number of different hardware configurations. For example, FIG. 11 is a block diagram of an industrial asset control system protection platform 1100 that may be, for example, associated with the system 100 of FIG. 1. The industrial asset control system protection platform 1100 comprises a processor 1110, such as one or more commercially available Central Processing Units ("CPUs") in the form of one-chip microprocessors, coupled to a communication device 1120 configured to communicate via a communication network (not shown in FIG. 11). The communication device 1120 may be used to communicate, for example, with one or more remote threat nodes, user platforms, digital twins, etc. The industrial asset control system protection platform 1100 further includes an input device 1140 (e.g., a computer mouse and/or keyboard to input adaptive and/or predictive modeling information) and/an output device 1150 (e.g., a computer monitor to render a display, provide alerts, transmit recommendations, and/or create reports). According to some embodiments, a mobile device, monitoring physical system, and/or PC may be used to exchange information with the industrial asset control system protection platform 1100.

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112 and/or a threat detection model 1114 for controlling the processor 1110. The processor 1110 performs instructions of the programs 1112, 1114, and thereby operates in accordance with any of the embodiments described herein. For example, the processor 1110 may access a normal space data source that stores, for each of a plurality of threat nodes, a series of normal threat node values that represent normal operation of an industrial asset control system. The processor 1110 may also access a threatened space data source that stores a series of threatened threat node values. The processor 1110 may generate sets of normal and threatened feature vectors and calculate and output a decision boundary for a threat detection model based on the normal and threatened feature vectors. The plurality of threat nodes may then generate a series of current threat node values that represent a current operation of the asset control system. The processor 1110 may receive the series of current values, generate a set of current feature vectors, execute the threat detection model, and transmit a threat alert signal based on the current feature vectors and the decision boundary.

The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, information may be "received" by or "transmitted" to, for example: (i) the industrial asset control system protection platform 1100 from another device; or (ii) a software application or module within the industrial asset control system protection platform 1100 from another software application, module, or any other source.

In some embodiments (such as the one shown in FIG. 11), the storage device 1130 further stores a threat detection database 1200. An example of a database that may be used in connection with the industrial asset control system protection platform 1100 will now be described in detail with respect to FIG. 12. Note that the database described herein is only one example, and additional and/or different information may be stored therein. Moreover, various databases might be split or combined in accordance with any of the embodiments described herein.

Referring to FIG. 12, a table is shown that represents the threat detection database 1200 that may be stored at the industrial asset control system protection platform 1100 according to some embodiments. The table may include, for example, entries identifying threat nodes associated with a physical system. The table may also define fields 1202, 1204, 1206, 1208, 1210, 1212 for each of the entries. The fields 1202, 1204, 1206, 1208, 1210, 1212 may, according to some embodiments, specify: a threat node identifier 1202, threat node values 1204, features 1206, feature vectors 1208, a global feature vector 1210, and a decision 1212. The threat detection database 1200 may be created and updated, for example, when a new physical system is monitored or modeled, threat nodes report values, operating conditions change, etc.

The threat node identifier 1202 may be, for example, a unique alphanumeric code identifying a threat node in an industrial asset control system that detects the series of threat node values 1204 over time (e.g., in batches of 30 to 50 seconds of data). The threat node values 1204 may be used to create the features 1206 and feature vectors 1208. The feature vectors 1210 associated with multiple threat node identifiers 1202 may then be used to create an overall global feature vector 1210 for the entire industrial asset control system. The global feature vector 1210 can then be compared to a decision boundary to generate the decision 1212 (e.g., an "attack" or a "normal" indication).

Thus, embodiments may enable the passive detection of indications of multi-class abnormal operations using real-time signals from threat nodes. Moreover, the detection framework may allow for the development of tools that facilitate proliferation of the invention to various systems (i.e., gas turbines, steam turbines, wind turbines, aviation engines, locomotive engines, power grid, etc.) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new earnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to industrial asset control system operators so that an attack may be thwarted (or the effects of the attack may be blunted), reducing damage to equipment.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as damns, the power grid, military devices, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an industrial asset control system, comprising:
   a plurality of threat nodes each generating a series of current threat node values over time that represent a current operation of the industrial asset control system;
   a threat detection computer, coupled to the plurality of threat nodes, to:
      (i) receive the series of current threat node values and generate a set of current feature vectors,
      (ii) access a threat detection model having at least one decision boundary created using a set of normal feature vectors and a set of threatened feature vectors, and
      (iii) execute the threat detection model and transmit a threat alert signal based on the set of current feature vectors and the at least one decision boundary;
   a normal space data source, for each of the plurality of threat nodes, of a series of normal threat node values over time that represent normal operation of the industrial asset control system;
   a threatened space data source, for each of the plurality of threat nodes, of a series of threatened threat node values over time that represent a threatened operation of the industrial asset control system; and
   a threat detection model creation computer, coupled to the normal space data source and the threatened space data source, to:
      (i) receive the series normal threat node values and generate the set of normal feature vectors,
      (ii) receive the series of threatened threat node values and generate the set of threatened feature vectors, and
      (iii) automatically calculate and output the at least one decision boundary for the threat detection model based on the set of normal feature vectors and the set of threatened feature vectors.

2. The system of claim 1, wherein at least one of the set of normal feature vectors and the set of threatened feature vectors are associated with at least one of: (i) principal components, (ii) statistical features, (iii) deep learning features, (iv) frequency domain features, (v) time series analysis features, (vi) logical features, (vii) geographic or position based locations, and (viii) interaction features.

3. The system of claim 1, wherein the threat detection model including the at least one decision boundary is dynamically adapted based on at least one of: (i) a transient condition, (ii) a steady state model of the industrial asset control system, and (iii) data sets obtained while operating the system as in self-learning systems from incoming data stream.

4. The system of claim 1, wherein the threat detection model is associated with at least one of: (i) an actuator attack, (ii) a controller attack, (iii) a threat node attack, (iv) a plant state attack, (v) spoofing, (vi) financial damage, (vii) unit availability, (viii) a unit trip, (ix) a loss of unit life, and (x) asset damage requiring at least one new part.

5. The system of claim 4, wherein info nation from each of the plurality of threat nodes is normalized and an output is expressed as a weighted linear combination of basis functions.

6. The system of claim 5, wherein natural basis vectors are obtained using covariance of a threat node data matrix.

7. The system of claim 1, wherein the threat nodes are associated with at least one of: (i) critical sensor nodes, (ii) actuator nodes, (iii) controller nodes, and (iv) key software nodes.

8. The system of claim 1, wherein the threat detection model including the at least one decision boundary is associated with at least one of: (i) a line, i) a hyperplane, and (iii) a non-linear boundary separating normal space and threatened space.

9. The system of claim 1, wherein the threat detection model including the at least one decision boundary is a multi-class decision boundary separating normal space, threatened space, and degraded operation space.

10. The system of claim 1, wherein at least one of the series of normal threat node values and the series of threatened threat node values are associated with a high fidelity equipment model.

11. The system of claim 1, wherein at least one decision boundary exists in a multi-dimensional space and is associated with at least one of: (i) a dynamic model, (ii) design of experiment data, (iii) machine learning techniques, (iv) a support vector machine, (v) a full factorial process, (vi) Taguchi screening, (vii) a central composite methodology, (viii) a Box-Behnken methodology, (ix) real-world operating conditions, (x) a full-factorial design, (xi) a screening design, and (xii) a central composite design.

12. The system of claim 1, wherein the plurality of threatened threat node values were generated from a set of potential threat vectors in accordance with a risk priority number analysis including at least one of: (i) a level of expertise, (ii) an amount of time, (iii) a level of ease, and (iv) an amount of damage.

13. The system of claim 1, wherein the threat detection model is associated with decision boundaries and at least one of: (i) feature mapping, and (ii) feature parameters.

14. The system of claim 1, wherein at least one of the normal and threatened threat node values are obtained by running design of experiments on an industrial control system associated with at least one of: (i) a power turbine, (ii) a jet engine, (iii) a locomotive, and (iv) an autonomous vehicle.

15. A computerized method to protect an industrial asset control system, comprising:
   using a processor to
      receive from a plurality of threat nodes a series of current threat node values over time that represent a current operation of the industrial asset control system and generate a set of current feature vectors;
retrieve, for each of the plurality of threat nodes, a series of normal threat node values over time that represent normal operation of the industrial asset control system;
generate a set of normal feature vectors based on the normal threat node values;
retrieve, for each of the plurality of threat nodes, a series of threatened threat node values over time that represent a threatened operation of the industrial asset control system;
generate a set of threatened feature vectors based on the threatened threat node values;
automatically calculate and output at least one decision boundary for a threat detection model based on the set of normal feature vectors and the set of threatened feature vectors; and
execute the threat detection model and transmit a threat alert signal based on the set of current feature vectors and the at least one decision boundary.

16. The method of claim 15, wherein the at least one decision boundary exists in a multi-dimensional space and is associated with at least one of: (i) a dynamic model, (ii) design of experiment data, (iii) machine learning techniques, (iv) a support vector machine, (v) a full factorial process, (vi) Taguchi screening, (vii) a central composite methodology, (viii) a Box-Behnken methodology, (ix) real-world operating conditions, (x) a full-factorial design, (xi) a screening design, and (xii) a central composite design.

17. The method of claim 15, wherein at least one of the set of normal feature vectors and the set of threatened feature vectors are associated with at least one of: (i) principal components, (ii) statistical features, (iii) deep learning features, (iv) frequency domain features, (v) time series analysis features, (vi) logical features, (vii) geographic or position based locations, and (viii) interaction features.

18. The method of claim 15, wherein the plurality of threatened, node values were generated from a set of potential threat vectors in accordance with a risk priority number analysis including at least one of: (i) a level of expertise, (ii) an amount of time, (iii) a level of ease, and (iv) an amount of damage.

19. The method of claim 15, wherein at least one decision boundary is dynamically adapted based on at least one of: (i) a transient condition, (ii) a steady state model of the industrial asset control system, and (iii) data sets obtained while operating the system as in self-learning systems from incoming data streams.

20. The method of claim 15,. wherein information from each of the plurality of threat nodes is normalized and output is expressed as a weighted linear combination of basis functions.

21. The method of claim 20, wherein natural basis vectors are obtained using covariance of a threat node data matrix.

* * * * *